Patented Mar. 16, 1948

2,437,980

UNITED STATES PATENT OFFICE 2,437,980

CHLOROBENZALACETONE COPOLYMER

Raymond B. Seymour and David T. Mowry, Dayton, Ohio, assignors to Monsanto Chemical Company, St. Louis, Mo., a corporation of Delaware No Drawing. Application April 15, 1944, Serial No. 531,282

6 Claims. (Cl. 260—63)

The present invention deals with copolymers of chlorobenzalacetone, particularly with copolymers of nuclearly chlorinated benzalacetone and diolefinic hydrocarbons, and to a method of producing the same.

An object of the present invention is to produce new, rubbery copolymers. Another object of the invention is the preparation, in good yields, of synthetic, rubbery copolymers having improved mechanical strength, solvent resistance, flame resistance and resistance to aging.

These and other objects which will be hereinafter disclosed are provided by the following invention wherein there are prepared copolymers of butadiene compounds with chlorobenzalacetone. For the preparation of my new, rubber-like products we use as the diolefinic constituent a compound having the general structure:

wherein R or R' is a member of the group consisting of hydrogen, chlorine and methyl, i. e., butadiene, isoprene, chloroprene, 2,3-dimethylbutadiene, 2,3-dichlorobutadiene, etc. As the chlorobenzalacetone component of the copolymers we employ a compound having the general formula:

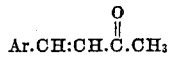

wherein Ar stands for a chlorine containing phenyl radical, that is, mono-, di- or poly-chlorinated phenyl radical. As illustrative of compounds having the above general formula are, e. g., para-chlorobenzalacetone, ortho-chlorobenzalacetone, meta-chlorobenzalacetone, 2,6-dichlorobenzalacetone, 3,5 - dichlorbenzalacetone, 2,3 - dichlorobenzalacetone, 2,5 - dichlorobenzalacetone, the individual nuclearly tri-chlorinated benzalacetones or mixtures of the same, the individual nuclearly tetrachlorinated benzalacetones or mixtures of the same, pentachlorobenzalacetone, etc.

The present copolymers are soft, elastic, rubber-like materials which may be compounded like natural rubbers and subsequently vulcanized to hard products of very good tensile strength and resistance to aging. The compounded and vulcanized copolymers are thus highly suitable for the production of automobile tires, rubber footwear, rubber coated wearing apparel, electrical insulating compositions as for coating wire, etc. The new copolymers may also be molded directly, without compounding or vulcanizing, to give products resembling rubber. They are also readily extruded or drawn into flexible fibers.

We prepare our new, synthetic rubbers by polymerization, preferably in emulsion, of a mixture containing a butadiene compound and from, say, 2% to 50% by weight of the mixture of one or more of the above-mentioned chlorobenzalacetones. Particularly valuable products are obtained by using from 25% to 30% of the chlorobenzalacetone based on the total weight of monomeric mixture. The copolymers obtained from a chlorobenzalacetone and a butadiene compound, particularly a chlorine-containing butadiene compound such as chloroprene or 2,3-dichlorobutadiene are characterized by extremely high resistance to heat. The present copolymers are likewise insoluble or substantially unaffected by all of the commonly employed organic solvents including gasoline and other hydrocarbon solvents.

The present invention is illustrated, but not limited, by the following examples:

Example I 62 grams of a mixture consisting of 25 parts by weight of para-chlorobenzalacetone and 75 parts by weight butadiene was agitated for 22 hours at a temperature of 50° C. in a system, held at a pH of approximately 7.1 and consisting of 0.85 gram of monosodium phosphate, 9.0 grams of disodium phosphate, 4.4 grams of an alkylbenzene sulfonate wetting agent, 0.5 gram of dodecylmercaptan, 0.5 gram potassium persulfate, and 180 grams of water. At the end of this time 2 grams of an anti-oxidant such as a condensation product of aminobiphenyl and acetone was added to the product and the latex was coagulated with an aqueous solution of sulfuric acid and sodium chloride. There was thus obtained a 95% yield of a very tacky, rubbery material, which was then prepared for processing by washing free of emulsifier and drying for 16 hours at a temperature of 45° C. and a pressure of 2 mm. of mercury.

100 parts of the purified copolymer thus obtained was compounded with 40 parts of a carbon black, 3 parts of zinc oxide, 1 part of stearic acid, 1.75 parts of sulfur and 1.2 parts of a rubber vulcanization accelerator such as a condensation product of mercaptobenzothiazole with cyclohexylamine and the compounded material was cured by heating it for 90 minutes at a temperature of 142° C. The following evaluation data were obtained for the cured product, before and after aging for 24 hours in circulating air at a temperature of 100° C.

|  | Before Aging | After Aging |
|---|---|---|
| Shore Hardness | 67 | 74 |
| Tensile Strength p. s. i. | 2,240 | 2,640 |
| Young's Modulus of Elasticity (at 300% elongation) | 1,280 | 2,160 |
| Elongation | 440 | 350 |

The above values for tensile strength were determined on the Scott tester, according to the procedure described in the January 25, 1930, issue of "Rubber Age."

For purposes of comparison a butadiene-styrene copolymer (75:25) was prepared by emulsion polymerization procedure herein described, purified, and then compounded and cured as described above for the present butadiene-para-chlorobenzalacetone copolymer. Evaluation of the resulting compounded and cured butadiene-styrene copolymer by the testing procedure employed above gave the following values:

|  | Before Aging | After Aging |
|---|---|---|
| Shore Hardness | 72 | 79 |
| Tensile Strength | 1,900 | 730 |
| Young's Modulus of Elasticity (at 300% elongation) | 1,075 | |
| Elongation | 420 | 120 |

With respect to tensile strength, modulus of elasticity and elongation the butadiene-para-chlorobenzalacetone copolymer surpasses the butadiene-styrene copolymer. In these respects our new, rubbery interpolymer is better after aging than the butadiene-styrene copolymer is before aging.

We are aware that in the I. G. Farbenindustrie British Patent No. 349,976 there is disclosed the copolymerization of butadiene with ketonic monomers and that an example of the copolymerization of butadiene with benzalacetone is given therein. We have prepared a 25:75 benzalacetone-butadiene copolymer by the emulsification procedure described above for the para-chlorobenzalacetone-butadiene copolymer and have obtained the chlorine-free copolymer in a yield of 62%. Apparently the presence of the chlorine atom in the benzene nucleus has an activating effect on the copolymerization, for as shown above, the yield of the para-chlorobenzalacetone-butadiene copolymer similarly obtained is 95%. Upon purifying, compounding and curing the benzalacetone-butadiene copolymer by the procedures described above the product was submitted to testing, and the following results were obtained:

|  | Before Aging | After Aging |
|---|---|---|
| Shore Hardness | 70 | Too brittle to test. |
| Tensile Strength p. s. i. | 2,050 | Do. |
| Young's Modulus of Elasticity (at 300% elongation) | 1,470 | Do. |
| Elongation | 390 | Do. |

While the benzalacetone-butadiene copolymer has moderately good properties, it is definitely embrittled upon aging and is therefore of little use as a natural rubber substitute. That the presence of a nuclear, chlorine substituent in the benzalacetone has so great an effect on the aging properties is surprising and could not have been predicted by the teachings of the British patent referred to above.

*Example 2*

100 g. of a mixture consisting of 25 parts by weight of 2,6-dichlorobenzalacetone and 75 parts by weight of butadiene was emulsion polymerized by the procedure described in Example 1, except that the emulsion was shaken for only 20 hours at a temperature of 50° C. There was thus obtained a 90% yield of a tacky elastic material. Upon compounding this product as described in Example 1 and curing it for a time of 60 minutes at a temperature of 142° C., there was obtained a readily extrudable, hard, solvent- and flame-resistant, rubbery product.

Evaluation of the cured and compounded material, employing the evaluation procedures described in Example 1, before and after aging for 1 day in circulating air at a temperature of 100° C., gave the following values:

|  | Before Aging | After Aging |
|---|---|---|
| Tensile Strength p. s. i. | 1,620 | 2,500 |
| Per cent Elongation | 560 | 480 |
| Firestone Plasticity sec. | 5 | |

Comparison of the above values for those shown in Example 1 for a similarly prepared product from a benzalacetone-butadiene copolymer shows that the present copolymer has better tensile strength and per cent elongation before aging than does the chlorine-free copolymer before aging. Also, the Firestone plasticity of benzalacetone-butadiene copolymer of Example 1 is 11 seconds, whereas that of the present copolymer is only 5 seconds. This lowering of the Firestone plasticity value allows the material to be more readily processed.

*Example 3*

100 g. of a mixture consisting of 75 parts of butadiene, 15 parts by weight of styrene and 10 parts by weight of 2,6-dichlorobenzalacetone was emulsion polymerized by the procedure described in Example 1. Upon compounding the resulting copolymer as described in Example 1 and curing it for a time of 60 minutes at a temperature of 142° C. there was obtained a hard, solvent- and flame-resistant, rubbery product which showed the following properties:

|  | Before Aging | After Aging |
|---|---|---|
| Tensile Strength p. s. i. | 1,885 | 2,425 |
| Per cent Elongation | 450 | 305 |
| Firestone Plasticity sec. | 6 | |

The above values were obtained by using the evaluation procedures described in Example 1. Aging of the compounded and cured product was effected by maintaining it for 24 hours in circulating air at a temperature of 100° C.

Comparison of these values with those given for a butadiene-styrene copolymer in Example 1 shows that the use of 2,6-dichlorobenzalacetone with the butadiene and styrene materially raises the aging properties and that thereby there is also obtained much greater tensile strength, either before or after aging.

Similarly valuable products are likewise obtainable by emulsion copolymerization of butadiene with the other chlorinated benzalacetones herein disclosed, instead of the para-chlorobenzalacetone or the 2,6-dichlorobenzalacetone used in the above examples. Also, instead of employing butadiene as the diolefinic constituent of our new synthetic rubbers, we may employ other butadiene compounds of the general formula herein disclosed, for example, isoprene, 2,3-dimethylbutadiene, 2,3-dichlorobutadiene or chloroprene.

While the production of our new, rubbery copolymers, as shown in the above example, has been described specifically by polymerization in emulsion, other polymerizing methods may be employed, for example, by polymerization in the presence of sodium or boron trifluoride, as will be apparent to those skilled in the art. Moreover, instead of employing the emulsifying media shown above, there may be employed other expedients of emulsification. For example, instead of using dodecyl-mercaptan or carbon tetrachloride as the modifier, there may be employed the reaction product of hydrogen sulfide and triisobutylene or trichloropropionitrile, and instead of maintaining the pH by means of a mixture of phosphates, other buffer compounds may be used. The alkylbenzene sulfonate wetting agent shown above may be replaced by any other surface-active material, such as sodium lauryl sulfate, a sodium alkyl aryl sulfonate, etc. Other oxygen-liberating polymerization catalysts such as ammonium persulfate, sodium perborate, hydrogen peroxide or benzoyl peroxide may be employed instead of potassium persulfate. The temperature at which the emulsion polymerization is conducted may be varied over the range of 30° C. to 80° C.

For certain purposes it may be desirable to incorporate into the monomeric mixtures one or more additional components which are able to enter into the copolymerizing reaction. As such added components there may be used any compound having an olefinic double bond (>C:C<) or preferably a vinyl (—CH:CH₂) or vinylidene (>C:CH₂) group. Compounds containing an olefinic double bond and in the same compound at least one negative substituent such as phenyl, substituted phenyl, chloro, bromo, cyano, carboxy, carbalkoxy (e. g. carbomethoxy, carboethoxy, etc.), carboxamido and alkoxy, may be advantageously employed. Suitable compounds are: styrene, the nuclearly substituted styrenes such as the chloro-, bromo-, fluorostyrenes, the methyl-, ethyl- or isopropyl styrenes, alpha-methylstyrene, alpha-para-dimethylstyrene, the cyanostyrenes, the amino styrenes, the nitro styrenes, or the vinyl phenols; acrylic acid or derivatives thereof such as methyl or ethyl acrylate, methyl or ethyl methacrylate, acrylonitrile or methacrylonitrile, acrylamide or methacrylamide, acrylyl chloride or methacrylyl chloride; esters of lower aliphatic acids with vinyl alcohol, for example, vinyl acetate, vinyl propionate or vinyl butyrate; vinyl halides such as vinyl chloride, vinyl fluoride; vinylidene halides such as vinylidene chloride or 1-chloro-1-fluoroethylene; unsaturated acids or their derivatives such as maleic anhydride, chloromaleic anhydride, maleonitrile, fumaronitrile, crotonic acid or its derivatives such as methyl or ethyl crotonate or crotononitrile; cinnamic acid and derivatives such as ethyl cinnamate, cinnamonitrile, etc. Where it is desired to confer very high solvent- and heat-resistance, compounds containing at least two non-conjugated double bonds, i. e., cross-linking agents, such as diallyl maleate, divinylbenzene or methallyl acrylate, may be advantageously incorporated into the monomeric mixture of the butadiene compound and the chlorobenzalacetone.

A great deal of latitude may be thus exercised in selecting a third or even a fourth interpolymerizing component in the initial monomeric mixture. Generally, inclusion of a chlorobenzalacetone in monomeric mixtures containing a butadiene as a major component confers simultaneously greater tensile strength, solvent- and flame-resistance and age-risistance to the final product, irrespective of the nature of other olefinic materials that may be present in the monomeric mixture. The ratio of individual monomers present in the monomeric mixture may be widely varied. However, in order to assure the production of desirable rubbery materials it is recommended that at least from 5% to 30% by weight of the total monomeric mixture be a chlorobenzalacetone (or a mixture of isomeric chlorobenzalacetones), and that at least 50% to 80% by weight of said monomeric mixture be a butadiene compound. Where a third copolymerizable material is employed in the monomeric mixture, it should usually be present to the extent of 5% to 30% by weight of the monomeric mixture.

Non-rubbery materials may be obtained from a butadiene compound and a chlorobenzalacetone either by employing a quantity of the chlorobenzalacetone which is in excess, of say, 60% of the monomeric mixture or by thermal polymerization of any mixture of a butadiene compound and one or more of the present chlorobenzalacetones in the absence of a catalyst. Such non-rubbery copolymers are hard, resinous masses which may be employed in the plastic and coating industries, as adhesives in the production of laminated products, etc.

It is to be understood that the foregoing detailed description is given merely by way of illustration and that many variations may be made therein without departing from the spirit of the invention which is limited only by the following claims.

What we claim is:

1. An interpolymer comprising the polymerization product of a mixture of parachlorobenzalacetone and 1,3-butadiene, said mixture containing between 2% and 50% by weight of para-chlorobenzalacetone, the balance being 1,3-butadiene.

2. An interpolymer comprising the polymerization product of a mixture of from 2% to 50% by weight of 2,6-dichlorobenzalacetone and the balance 1,3-butadiene.

3. An interpolymer comprising the polymerization product of a mixture containing from 5% to 30% by weight of a nuclearly chlorinated benzalacetone, 5% to 30% by weight of styrene, the balance being 1,3-butadiene.

4. An interpolymer comprising the polymerization product of a polymerizable mixture containing from 2% to 50% by weight of a compound having the general formula:

Ar.CH:CHC.CH₃ where Ar is a phenyl radical containing at least one chlorine substituted in the ring, the balance of said polymerizable mixture consisting of material selected from the group consisting of (A) a compound having the structure:

CH₂:CR.CR':CH₂ where R and R' are selected from the group consisting of hydrogen, chlorine and methyl and (B) a mixture consisting of (A) and sufficient styrene to supply from 5% to 30% of styrene in said polymerizable mixture.

5. The process which comprises emulsifying in an aqueous solution a polymerizable mixture containing from 2% to 50% by weight of a compound having the general formula:

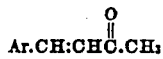

where Ar is a phenyl radical containing at least one chlorine substituted in the ring, the balance of said polymerizable mixture consisting of material selected from the group consisting of (A) a compound having the structure:

where R and R' are selected from the group consisting of hydrogen, chlorine and methyl and (B) a mixture consisting of (A) and sufficient styrene to supply from 5% to 30% of styrene in said polymerizable mixture and polymerizing said mixture by the application of heat thereto.

6. The process which comprises emulsifying in an aqueous solution a polymerizable mixture containing from 5% to 30% by weight of a nuclearly chlorinated benzalacetone, 5% to 30% by weight of styrene and the balance of said polymerizable mixture being 1,3-butadiene, and polymerizing the same by the application of heat thereto.

RAYMOND B. SEYMOUR.
DAVID T. MOWRY.

REFERENCES CITED

The following references are of record in the file of this patent:

UNITED STATES PATENTS

| Number | Name | Date |
|---|---|---|
| 1,901,354 | Meisenburg | Mar. 14, 1933 |
| 2,332,897 | D'Alelio | Oct. 26, 1943 |

FOREIGN PATENTS

| Number | Country | Date |
|---|---|---|
| 42,285 | France | Apr. 4, 1933 |
| 484,599 | Great Britain | May 9, 1938 |
| 494,752 | Great Britain | Oct. 25, 1938 |

OTHER REFERENCES

Beilstein Handbuch der Organische Chemie, vol. 7, page 367.